(12) United States Patent
Diehl et al.

(10) Patent No.: US 11,608,847 B2
(45) Date of Patent: Mar. 21, 2023

(54) SELF-PUNCHING FASTENER

(71) Applicant: PROFIL Verbindungstechnik GmbH & Co. KG, Friedrichsdorf (DE)

(72) Inventors: Oliver Diehl, Usingen (DE); Tobias Jene, Friedrichsdorf (DE); Amer Mahlme, Bad Homburg (DE); Christian Sowa, Muhlheim/Main (DE); Richard Humpert, Bad Nauheim (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 0 days.

(21) Appl. No.: 17/369,352

(22) Filed: Jul. 7, 2021

(65) Prior Publication Data

US 2022/0099128 A1   Mar. 31, 2022

(30) Foreign Application Priority Data

Jul. 10, 2020   (DE) .......................... 102020118262.7
Oct. 20, 2020   (DE) .......................... 102020127590.0

(51) Int. Cl.
*F16B 19/08* (2006.01)
*B21J 15/02* (2006.01)
(Continued)

(52) U.S. Cl.
CPC ........... *F16B 19/086* (2013.01); *B21J 15/025* (2013.01); *B21J 15/046* (2013.01); *B21J 15/147* (2013.01);
(Continued)

(58) Field of Classification Search
CPC ......... F16B 19/086; F16B 5/04; F16B 37/065
(Continued)

(56) References Cited

U.S. PATENT DOCUMENTS 2,138,409 A * 11/1938 Salter .................... F16B 37/065
411/972
3,985,172 A * 10/1976 Ballantyne ............ F16B 37/068
29/512

(Continued)

FOREIGN PATENT DOCUMENTS

DE   4239584   5/1994
DE   9321296   5/1997
(Continued)

*Primary Examiner* — Flemming Saether
(74) *Attorney, Agent, or Firm* — Gregory J. Gore, Esq.

(57) ABSTRACT

The present invention relates to a self-punching functional element that is adapted for punching into a workpiece, in particular into a sheet metal part. It comprises a head part forming a flange and having a contact surface for contact with the workpiece; and a punching section that extends away from the head part, in particular from the contact surface, and that is in particular arranged coaxially to a central longitudinal axis of the functional element. The punching section has a peripheral punching edge at its free end for punching through the workpiece and surrounds a cavity in a peripheral direction, said cavity having an opening defined by the punching edge. An inner wall of the punching section facing the cavity has at least one elevated slug securing portion projecting radially inwardly into the cavity, in particular wherein the elevated portion has the form of a rib extending in an axial direction.

14 Claims, 8 Drawing Sheets

(51) Int. Cl.
*B21J 15/04* (2006.01)
*B21J 15/14* (2006.01)
*B21J 15/36* (2006.01)
*B29C 65/56* (2006.01)
*B29C 65/00* (2006.01)
*F16B 5/04* (2006.01)
*F16B 19/06* (2006.01)

(52) U.S. Cl.
CPC ............ *B21J 15/36* (2013.01); *B29C 65/562* (2013.01); *B29C 66/41* (2013.01); *B29C 66/472* (2013.01); *B29C 66/721* (2013.01); *B29C 66/7394* (2013.01); *B29C 66/742* (2013.01); *B29C 66/81423* (2013.01); *B29C 66/81425* (2013.01); *B29C 66/81431* (2013.01); *B29C 66/8322* (2013.01); *F16B 5/04* (2013.01); *F16B 19/06* (2013.01); *B29C 2793/0045* (2013.01)

(58) Field of Classification Search
USPC .......................................... 411/179, 181, 183
See application file for complete search history.

(56) References Cited

U.S. PATENT DOCUMENTS

| | | | | |
|---|---|---|---|---|
| 4,430,034 | A * | 2/1984 | Fujikawa | B23P 19/062 29/512 |
| 6,802,682 | B2 * | 10/2004 | Stevenson | F16B 19/086 411/501 |
| 6,814,531 | B2 * | 11/2004 | Stevenson | F16B 19/086 411/452 |
| 9,700,933 | B2 * | 7/2017 | Diehl | B21J 15/36 |
| 9,844,810 | B2 * | 12/2017 | Diehl | B29C 65/562 |
| 10,598,203 | B2 * | 3/2020 | Ellis | B21J 15/06 |
| 2016/0221069 | A1 * | 8/2016 | Diehl | F16B 19/086 |
| 2017/0335876 | A1 | 11/2017 | Blaski | |
| 2021/0268569 | A1 * | 9/2021 | Werkmeister | F16B 19/086 |

FOREIGN PATENT DOCUMENTS

| | | |
|---|---|---|
| DE | 102006062073 | 7/2007 |
| DE | 102013217633 | 3/2015 |
| DE | 202017105715 | 10/2017 |
| DE | 102016119478 | 4/2018 |
| DE | 102018114982 A1 | 12/2019 |
| DE | 102019119627 | 2/2020 |
| EP | 1740344 B1 | 11/2012 |

* cited by examiner

SELF-PUNCHING FASTENER

FIELD OF THE INVENTION

The present invention relates to a self-punching functional element that is adapted for punching into a workpiece, in particular into a sheet metal part. The element comprises a head part forming a flange; and a punching section that extends away from the head part, that is in particular arranged coaxially to a central longitudinal axis of the functional element, and that has a peripheral punching edge.

BACKGROUND OF THE INVENTION

In the field of the connection elements or functional elements that are mechanically attached to workpieces, such as sheet metal parts, on the production thereof, a distinction is made between force fitting elements, on the one hand, and rivet elements, on the other hand. Force fitting elements are characterized in that they are at least not intentionally reshaped on attachment to a workpiece, but that the workpiece itself is reshaped and brought into engagement with shape features of the force fitting element, whereby the force fitting element is fastened to the sheet metal part in a manner secure against being pressed out. With rivet elements, the element is intentionally reshaped on the attachment to the sheet metal part, usually to form a rivet bead, whereby the sheet metal part is captured between the rivet bead and a flange part in order also here to achieve a connection secure against being pressed out.

Both force fitting elements and rivet elements are furthermore known as self-punching elements. The designation self-punching is to be understood such that the corresponding element punches its own hole into the workpiece in the course of the fastening process. The force required for this purpose is, for example, generated by a press, by a robot, or by a power-operated pair of tongs. In this respect, the self-punching element is pressed against the workpiece while the workpiece is supported on a corresponding die at the side remote from the element. Self-punching elements are associated with cost advantages since the workpiece does not have to be pre-punched.

Functional elements of the previously described kind are inter alia used—but by far not only used—in automotive engineering. With the expansion of the areas of use of self-punching functional elements, the demands on the safety of the corresponding process by means of which the elements are fastened to a workpiece also increase. The remaining of the slug punched out in the fastening process is one problem among others. If the slug is not reliably removed, it can damage the fastening tool and/or the workpiece. Ensuring a reliable slug removal is complex and therefore drives costs in some applications.

In some elements of a conventional type, the slug remains in the punching section. On the punching out of the slug, it is anchored therein. However, it cannot be ruled out that the slug releases under heavy loads or vibrations.

There is therefore a need for self-punching functional elements which can be reliably fastened to a workpiece in a simple manner and by which the disadvantages described above are avoided.

SUMMARY OF THE INVENTION

A self-punching functional element is provided by the present invention and satisfies this requirement. In accordance with the invention, provision is made that the functional element comprises a head part forming a flange and having a contact surface for contact with the workpiece; and a punching section that extends away from the head part, in particular from the contact surface, and that is in particular arranged coaxially to a central longitudinal axis of the functional element. The punching section has a peripheral punching edge at its free end for punching through the workpiece. The punching section surrounds a cavity in the peripheral direction, said cavity having an opening defined by the punching edge. An inner wall of the punching section facing the cavity further has at least one elevated slug securing portion projecting radially inwardly into the cavity. The elevated portion can, for example, have the form of a rib extending in an axial direction.

With the elevated slug securing portion, a possibility is provided of reliably securing a slug punched out of the workpiece in the element—more precisely in the cavity at least sectionally defined by the punching section—in a simple manner.

The element can be composed of metal and can, for example, be manufactured by a conventional cold impact process. The elevated slug securing portion can in this respect be formed at the same time. In general, the element can, however, also be produced (partly or completely) from another material, for example from a plastic.

The element is suitable for use with the most varied workpieces. It is preferably used at a sheet metal part. However, a fiber-reinforced plastic or a composite material can also be provided with an element in accordance with the invention.

Further embodiments of the invention are set forth in the description, in the claims, and in the enclosed drawings.

In accordance with an embodiment of the self-punching functional element, the punching section is designed as a rivet section that can be reshaped to establish a form fit with the workpiece. In general, the present invention can also be implemented with a force fitting element, however.

The contact surface can surround the punching section in the peripheral direction in an axial end view, in particular wherein the contact surface is of annular design. The punching section and/or the head part can also be of annular design. Basic shapes of the contact surface, of the punching section, and/or of the head part that deviate from a rotational symmetry are conceivable, for example oval or polygonal basic shapes.

To make the connection between the workpiece and the functional element particularly reliable—in particular when the workpiece comprises two layers to be connected —, the contact surface and an outer wall section of the punching section, which is arranged in parallel with the longitudinal axis, can be in connection with one another via a transition section. The transition section is formed and arranged at least sectionally curved and/or obliquely with respect to the longitudinal axis.

This design is in particular of advantage with a workpiece or a workpiece combination which comprises two or more layers and above all in which different materials are used, for example with a two-layer workpiece in which the component facing the element is a steel sheet metal part and the component remote from the element is an aluminum sheet metal part. Due to the punching and the subsequent deep drawing of the sheet metal materials, the lower sheet metal part is clamped between the upper sheet metal part and an inlet radius of the comparatively hard die. The inlet radius is the curvature of the die shape at its transition/edge to a contact surface for the workpiece.

It has been recognized that the lower sheet metal part is squeezed (too) much at the inlet radius of the die when the inlet radius of the die is (too) small. Therefore, the inlet radius of the die should be designed large enough, wherein the properties of the components involved are to be taken into account. To avoid cavities from arising between the layers of the workpiece and/or between the layers and the element, the transition section of the element that acts as a punching tool and a deep-drawing tool in accordance with the invention can have a curvature and/or a slope. The transition section can have a shape complementary to the inlet radius of the die. However, it is not absolutely necessary that the transition radius and the inlet radius have the same radii of curvature.

In accordance with an embodiment, the contact surface, the transition section, and/or the outer wall section is/are provided with at least one feature providing security against rotation, in particular wherein the feature providing security against rotation is an elevated portion or a recess. For example, the at least one feature providing security against rotation is a rib or groove extending in an axial direction or a radial direction. In a fastened state of the element, the feature providing security against rotation cooperates with the workpiece via a form fit such that the element can withstand greater torques. Various features providing security against rotation can be combined with one another as desired in order to achieve the security required in the specific application against a rotation of the element by torque elements acting at said element.

The elevated slug securing portion can be arranged in an axial end region of the cavity that is remote from the opening of the cavity. The end region preferably comprises less than 50%, preferably less than 40%, of an axial extent of the cavity. At least one section of the elevated slug securing portion is in particular further remote from an end section that bounds the cavity in the axial direction at a side remote from the opening than a thickness of the workpiece to be punched through. In the region of the opening of the cavity and in adjoining regions, the inner wall of the punching section is preferably free of elevated portions in order to optimize the punching process.

Provision can be made that the end section has a stepped recess.

The functional element can be a bolt element that has a bolt section that extends from the head part at a side remote from the punching section. The bolt section is in particular at least sectionally provided with an external thread. In a state fixed to a workpiece, such bolt elements, for example, serve as fastening points with the aid of which objects can be fastened to the workpiece. The bolt element can, for example, be a centering bolt, a ground bolt, a ball pin or the like.

The functional element can be a nut element. The nut element can have a passage opening, in particular a passage opening that extends through the punching section and through the head part of the functional element. The passage opening is in particular at least sectionally provided with an internal thread. Provision can, for example, be made that the internal thread is arranged in the head part or a section of the head part, whereas the punching section does not have an internal thread. The diameter of the passage opening can vary and can, for example, take on different values in the punching section, in the head section, and/or in the region of the internal thread. It is, however, also conceivable that an element is a blind hole nut. This element does not have a throughgoing opening, but is provided with a blind hole that preferably has an internal thread.

In a state fixed to a workpiece, such nut elements can serve as fastening points for fastening objects to the workpiece, wherein objects can, for example, be fastenable to the nut element by means of a fixing element, for instance by means of a screw or a threaded bolt.

The present invention further relates to a component assembly comprising a functional element in accordance with any one of the embodiments described above; and a workpiece, in particular at least one sheet metal part, wherein a slug punched out by the punching section is arranged in the cavity, which slug is held in a friction-locked and/or form-fitted manner in the cavity by the elevated slug securing portion.

In accordance with an embodiment of the component assembly, the slug can be held in a form-fitted manner in the cavity by a reshaped section of the elevated slug securing portion. The reshaping of said section in particular takes place on the manufacture of the component assembly, that is on the fastening of the element to the workpiece. The reshaped section of the elevated portion reliably secures the slug (possibly in addition to a friction fit) in the cavity such that the initially described problems are avoided. The reshaped section in particular engages behind the slug at a side remote from the head part.

The slug can be reshaped in a region adjacent to the elevated slug securing portion, in particular in a radial direction. For example, it has a notch that is created on the separation of the slug by a rib-like elevated slug securing portion. This contributes to an improvement of a friction locking between the element and the slug.

To avoid potentially interfering contours, provision can be made that the slug and the reshaped section of the elevated slug securing portion end flush with one another at a side remote from the head part. If a reshaping of the elevated slug securing portion is provided, material of the elevated portion can in this respect be sectionally pressed in the axial direction into the material of the slug such that it indeed engages behind the slug, but nevertheless does not significantly project beyond it in the axial direction.

The functional element of the component assembly can have a punching section that is formed as a rivet section, wherein a portion of the rivet section is reshaped such that it engages behind the workpiece at a side remote from the head part. The connection of the functional element and the workpiece is thereby particularly reliable. However, it is also conceivable that the component assembly comprises a force fitting element; and a workpiece, in particular wherein the workpiece is reshaped to provide a form-fit connection to the element.

The workpiece of the component assembly can comprise at least two components that are punched through by the punching section, whereby they are connected to one another. For example, the workpiece has two or more layers and/or comprises different materials in the region of the connection of the components.

A further aspect of the present invention relates to a method of fastening a self-punching functional element in accordance with at least one of the embodiments described above to a workpiece, said method comprising the steps:
  providing the workpiece and the functional element; and
  punching through the workpiece by means of the punching section of the functional element and separating a punching slug such that it is located in the cavity of the functional element,
wherein the slug is brought into engagement with the elevated slug securing portion such that the slug is held in a friction-locked and/or form-fitted manner in the cavity by the elevated slug securing portion.

The slug is in particular only brought into engagement with the elevated slug securing portion after the punching through of the workpiece such that the forces occurring on the bringing into engagement do not oppose the punching through, whereby the process forces to be applied are minimized.

In accordance with an embodiment of the method, the elevated slug securing portion is at least sectionally reshaped such that the slug is held in a form-fitted manner in the cavity by a reshaped section of the elevated slug securing portion, in particular such that the reshaped section engages behind the slug at a side remote from the head part.

A component assembly in accordance with any one of the embodiments described above is in particular provided by this method.

In accordance with a further embodiment of the method, on the fastening of the functional element, the workpiece is supported on a die that has a die punch which is introduced into the cavity of the functional element and by which the elevated slug securing portion is at least sectionally reshaped after the punching through, in particular wherein the sectional reshaping comprises at least partly scraping off the elevated slug securing portion from the inner wall of the punching section.

An embodiment of the method provides that the punching section of the functional element is formed as a rivet section that is reshaped by the die such that it engages behind the workpiece at a side remote from the head part.

The present invention will be explained in the following purely by way of example with reference to advantageous embodiments and to the enclosed drawings. They show:

BRIEF DESCRIPTION OF THE DRAWINGS

FIG. 5A an enlargement of a detail of FIG. 5;

DESCRIPTION OF INVENTION EMBODIMENTS

Figure 1:
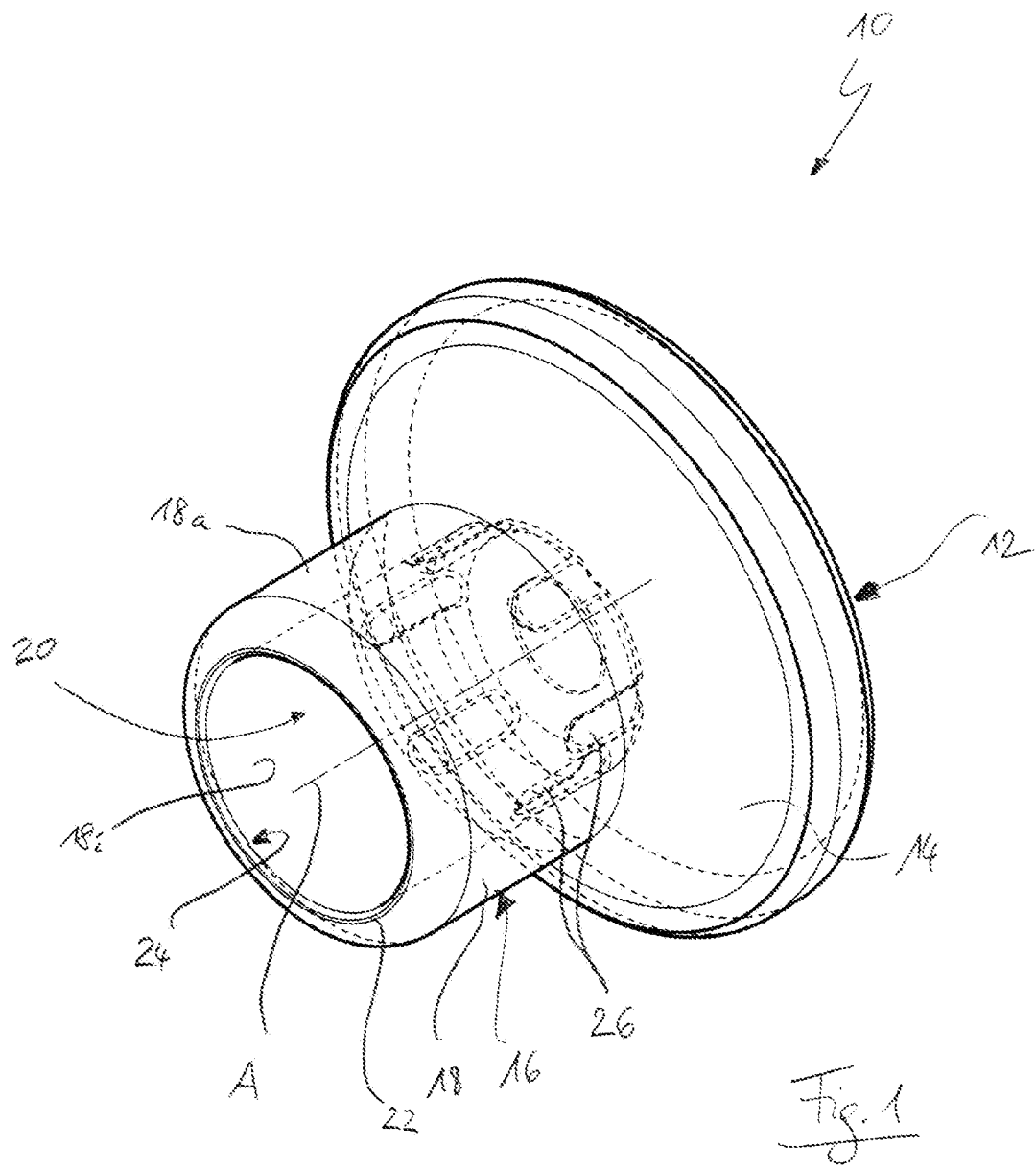
FIG. 1 an embodiment of the functional element in accordance with the invention.

FIG. 1 shows a self-punching element 10 that has a head part 12 that is adapted for an insertion into a workpiece. As a rule, the workpiece is a sheet metal part, in particular a metallic sheet metal part. It is generally, however, also possible to insert the element 10, for example, into a workpiece composed of a composite material or of a fiber-reinforced plastic component. The shape of the workpiece is freely selectable. The element is preferably composed of metal, but can be formed wholly or partly from another material, for example from a plastic.

As will be shown in the following, the element 10 serves to connect two layers of a workpiece in the present example. However, it is also conceivable that the head part 12 is provided with functional components that, for example, serve for fastening purposes. The head part 12 is in particular provided with a bolt section that extends from a side of the head part 12 remote from a contact surface 14. The bolt section can have an external thread. The head part 12 can alternatively also be provided with a component of a latch connection or the like. In general, the basic idea of the invention can be used with every self-punching functional element.

A punching section 16 that is formed by an annular wall 18, which is closed in the peripheral direction, extends from the head part 12 or the contact surface 14. The wall 18 at least sectionally defines a cavity 20. The substantially circular head part 12, the annular contact surface 14, and the punching section 16 are arranged coaxially to a longitudinal axis A of the element 10. Deviating from the embodiment shown, said components can also be non-rotationally symmetrical, for example oval or polygonal.

The punching section 16 serves to punch through the non-pre-punched workpiece. It thus forms the hole itself that is required for fastening the element 10, wherein a slug is separated from the workpiece. To optimize the punching process, the section 16 has a punching edge 22, which in turn defines an opening 24 of the cavity 10, at its free end remote from the head part 12. The punching edge 22 merges into an outer wall 18a or an inner wall 18i of the wall 18 via curved and/or inclined surfaces—viewed in the axial direction.

The dashed lines in FIG. 1 indicate aspects of the element 10 that would not actually be visible in the perspective view. It can thus be seen that axial ribs 26 uniformly distributed in the peripheral direction are arranged at the inner wall 18i, rise therefrom, and project into the cavity 20 in the radial direction.

Figure 2:
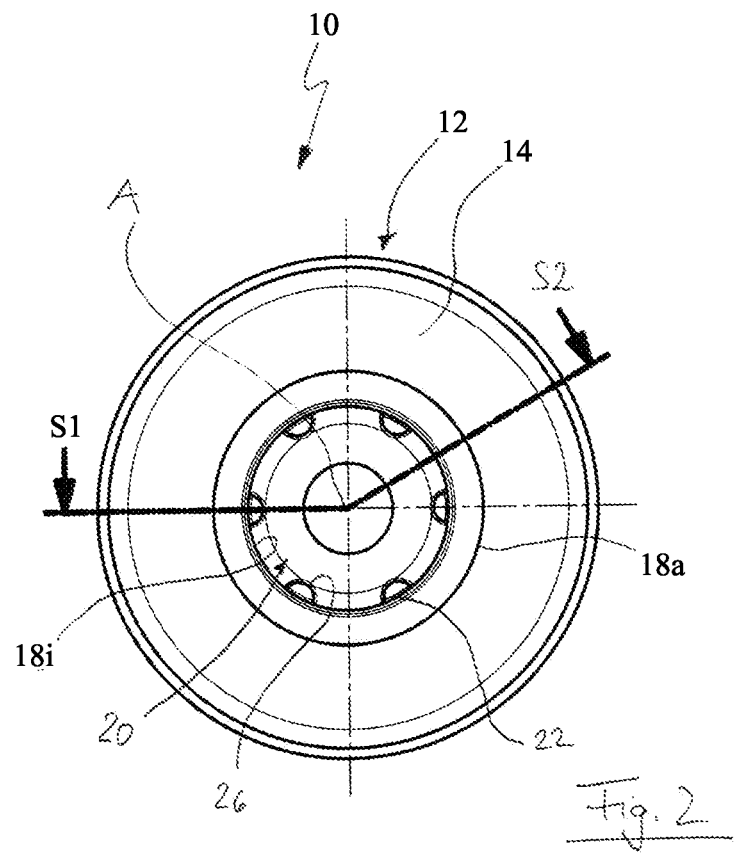
FIG. 2 an end face view of the element in accordance with FIG. 1.

FIG. 2 shows the element 10 in an axial view, whereby the ribs 26 can be seen at the inner wall 18i. In addition, sectional planes S1, S2 are indicated. The corresponding sectional views are shown in FIG. 3.

Figure 3:
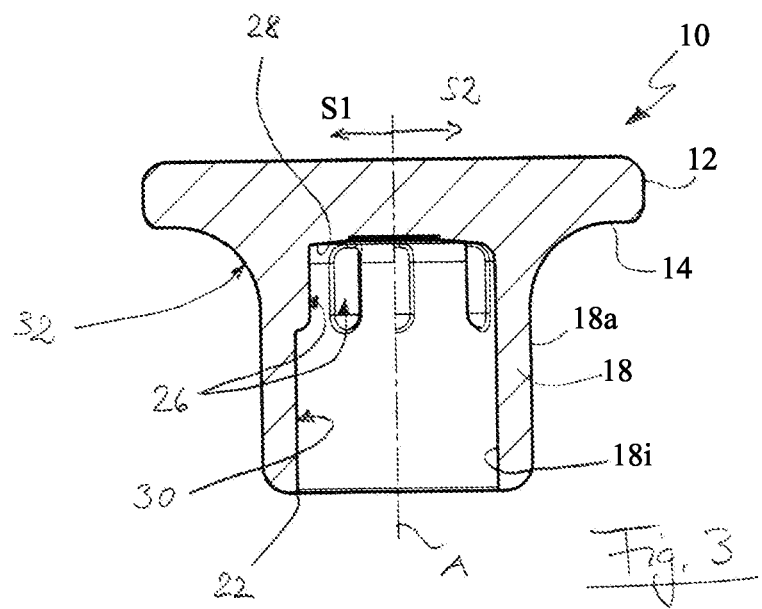
FIG. 3 a sectional view of the element in accordance with FIG. 1.

The left side of FIG. 3 shows a section through the element 10 in the plane S1 that is arranged such that an axial rib 26 is intersected. It can thereby be seen that the rib 26 extends in the axial direction from a base section 28, which bounds the cavity 20 at the head part side in the axial direction, up to approximately 33% of the axial extent of the cavity 20. The free end of the rib 26 is rounded or beveled to be able to more easily penetrate into the slug to be punched out. The axial and radial extents of the ribs 26 can generally be freely selected. As will still become visible from the following explanations, their axial extent is, however, at least slightly greater than the thickness of the slug or the thickness of the workpiece in the fastening region.

To simplify the punching process, a region of the inner wall 18*i* starting from the punching edge 22 is free of ribs 26 or other elevated portions. This region free of elevated portions preferably comprises more than 20%, more than 30%, more than 50%, or more than 60% of the axial extent of the cavity 20. The axial extent of the region 30 free of elevated portions is in particular at least slightly greater than the thickness of the slug or of the workpiece such that the separation of the slug is not impeded by elevated portions. The axial extent of the region 30 free of elevated portions preferably amounts to more than 120% of the thickness of the slug or of the workpiece.

The right side of FIG. 3 shows a section that does not pass through a rib 26. However, it can be seen from both sections that the outer wall 18*a* does not directly merge into the contact surface 14. A transition section 32 is provided therebetween and is designed as curved in the present example, wherein the radius of curvature is substantially constant. In addition, the geometry of the transition section 32 does not change in the peripheral direction. However, it is certainly conceivable that the transition section 32—alternatively or additionally—is designed at least sectionally obliquely with respect to the longitudinal axis A and/or its geometry varies in the peripheral direction and/or in the axial direction. The geometry of the peripheral section 32 can be fully adapted to the respective present requirements. A variation in the peripheral direction can, for example, result in an improvement of the security against rotation of the element 10.

Very generally, i.e. independently of other aspects of the respective embodiment, the contact surface 14 and/or the outer wall 18*a* can be provided with elevated portions and/or recesses (e.g. ribs or grooves) that act as features providing security against rotation. For example, the outer wall 18*a* can have ribs extending in the axial direction. Additionally or alternatively, the contact surface 14 can be provided with radial ribs.

Figure 4:
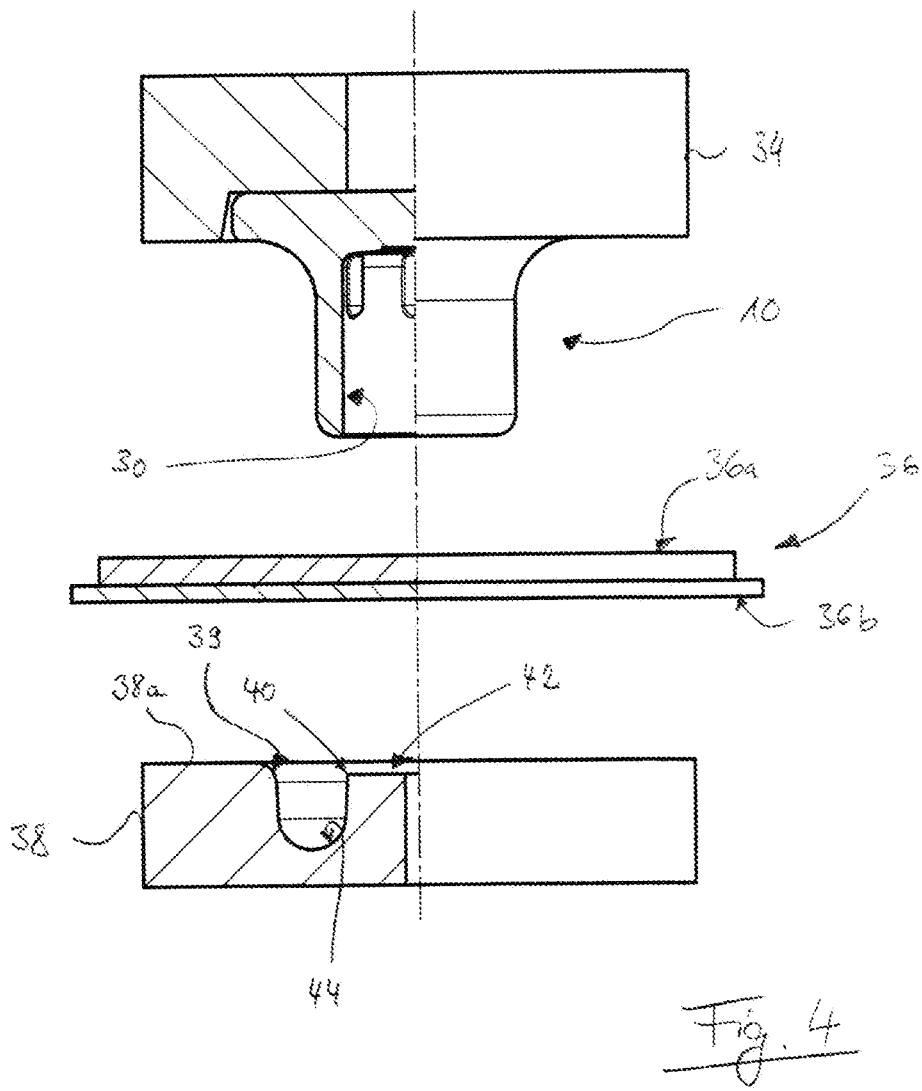
FIG. 4 a part sectional view of the components involved in a fastening of the element in accordance with FIG. 1 to a workpiece at the start of the fastening process.
Figure 5:
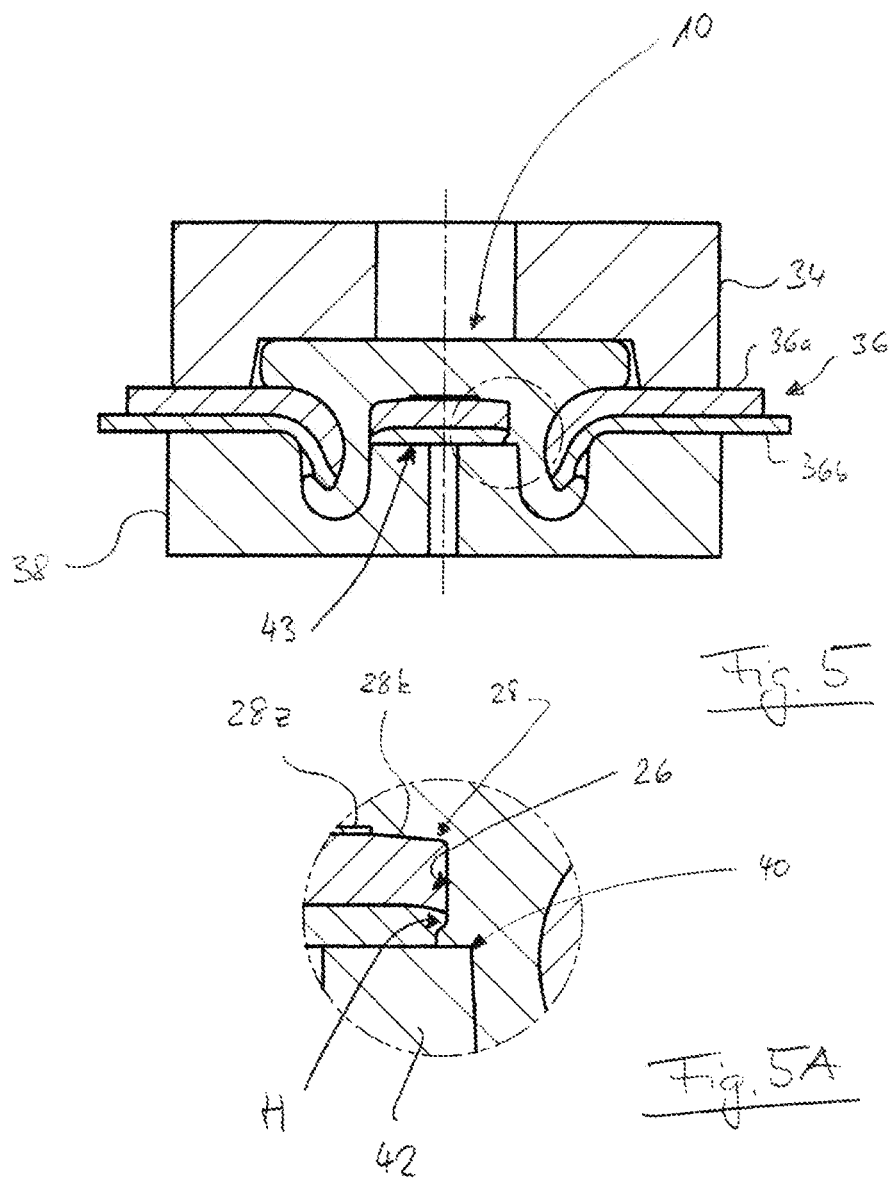
FIG. 5 a sectional view of the components in accordance with FIG. 4 after the completion of the fastening movement of the components involved.

FIG. 4 shows the element 10 as it is arranged in a setting head 34 of a setting device. The element 10 is to be inserted into a non-pre-punched workpiece 36, which has two layers 36*a* and 36*b* in the present embodiment, by means of the setting head 34. The setting device further comprises a die 38 that is arranged at the side of the workpiece 36 disposed opposite the setting head 34. During the fastening process, the workpiece 36 is supported on a support surface 38*a* of the die 38 and the setting head 34 presses the element 10 against the workpiece 36. In this respect, a separating edge 40 of a die punch 42 of the die 38 and the punching edge 22 of the element 10 cooperate and separate a slug 43 (see FIG. 5) from the workpiece 36.

The outer radius of the punch 42 is slightly smaller than the inner diameter of the region 30 free of elevated portions such that the punch 42 can penetrate into the cavity 20, with the separated slug 43 being pushed into the interior of said cavity.

After the separation of the slug 43, the wall 18 is bent radially outwardly by a U-shaped curved section 44 of the die 38 on a continuation of the movement of the setting head 34. Due to this reshaping, the reshaped section of the punching section 16 engages behind the workpiece 36. The punching section 16 thus also has the function of a rivet section so that the element 10 can also be designated as a self-punching rivet element.

On the punching through of the workpiece 36, the lower workpiece layer 36*b* is clamped between the upper workpiece layer 36*a* and an inlet radius 39 of the die 38. If the radius 39 is too small, the layer 36*b* is excessively stressed in the punching process. It therefore has to be suitably adapted while taking into account the properties of the layers 36*a*, 36*b*.

The state described above is shown in FIG. 5. The contact surface 14 contacts the layer 36*a*. It can further be seen that a good contact of the downwardly bent-over hole edge sections of the workpiece 36 with the element 10 was achieved by the design of the transition section 32. In this respect, the transition section 32 has a slightly larger radius of curvature than the inlet radius 39 in order to take into account the geometric conditions and the properties (e.g. material properties, thickness) of the layers 36*a*, 36*b*.

On the insertion of the element 10, the slug 43 is pushed into the cavity—as described above. As soon as the slug 43 enters into the region of the cavity 20 that is provided with the axial ribs 26, said axial ribs 26 dig into the outer side of the slug 43. Since the axial ribs 26 are longer in the axial direction than the thickness of the slug 43, the free ends of the ribs 26 emerge from the side of the slug 43 facing the die punch 42 at a certain point in time.

They then come into contact with the punch 42 whose outer radius is only slightly smaller than the inner radius of the cavity 20. Consequently, the ribs 26 are scraped off from the inner wall 18*i* by the action of the punch 42 and are pressed into the layer 36*b* of the workpiece 36, as can also be easily seen from FIG. 5A, that is an enlargement of the part of FIG. 5 marked with a dashed circle. In this respect, an undercut H is produced that reliably secures the slug 43 in the cavity 20.

This process continues until the setting device is closed. In a suitable embodiment of the punch 42, the slug then abuts the base section 28. In the present example, the base section 28 comprises a slightly conical section 28*k* and a central cylindrical recess 28*z*.

Figure 6:
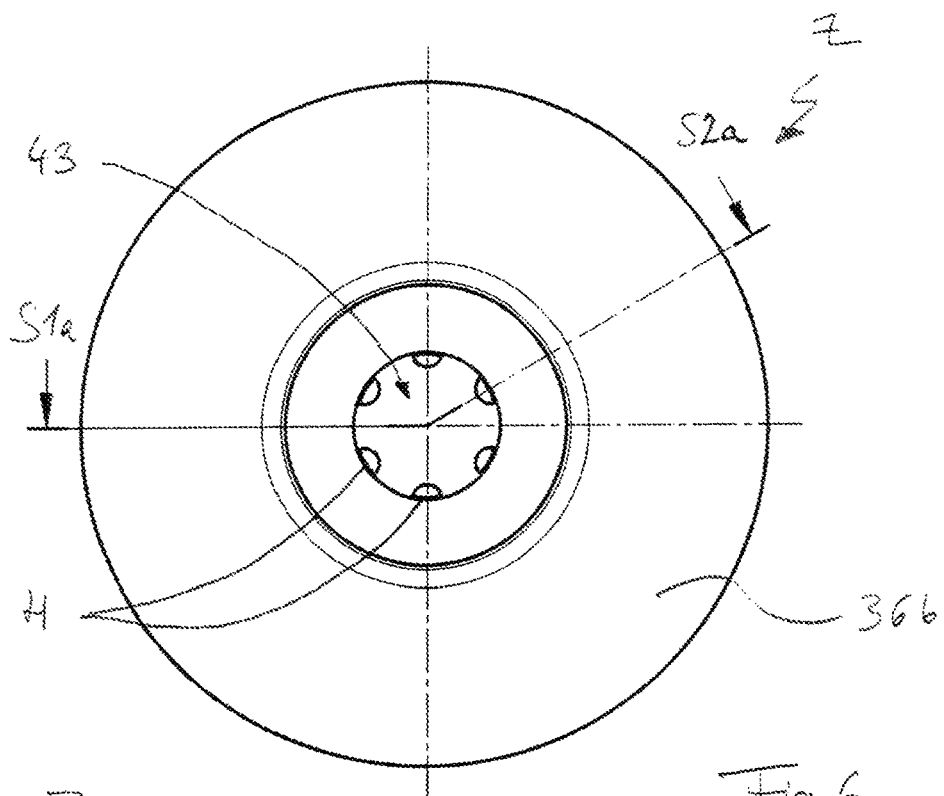
FIG. 6 an end face view of the component assembly obtained.
Figure 7:
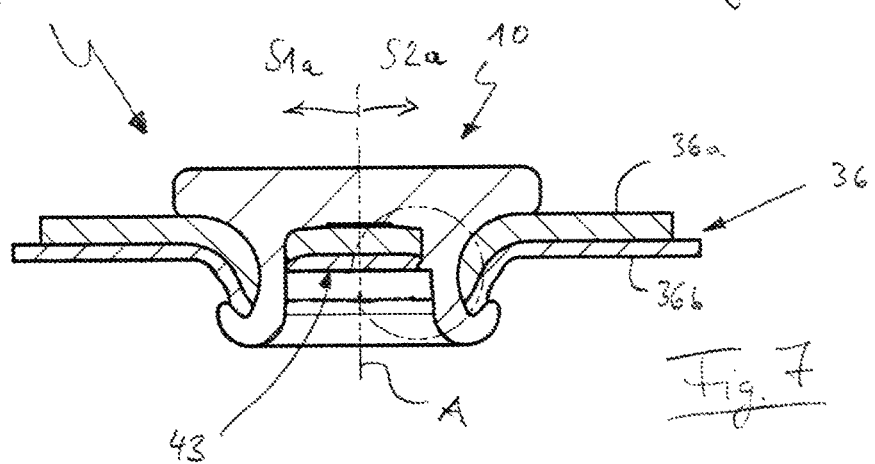
FIG. 7 a sectional view of the component assembly in accordance with FIG. 6.
Figure 7A:
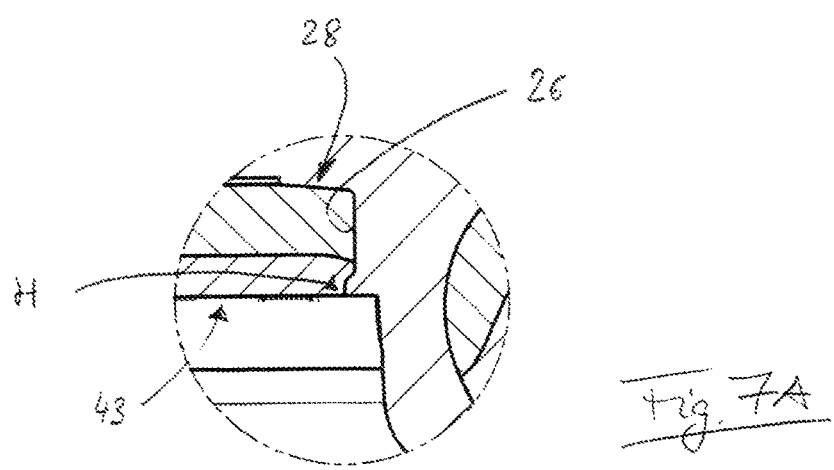
FIG. 7A an enlargement of a detail of FIG. 7.

The component assembly Z obtained is shown in FIGS. 6, 7, and 7A (partial enlargement of FIG. 7). FIG. 6 shows an axial view from below such that the undercuts H pressed into the layer 36*b* of the slug 43 can be seen that were formed by the scraped-off sections of the ribs 26. FIG. 7 shows sections through the component assembly Z along the sectional planes S1*a*, S2*a* (see FIG. 6).

Deviating from the embodiment of the invention described above as an example, a reshaping of the axial ribs 26 can also be dispensed with. The slug 43 is then held in the cavity solely in a friction-locked manner. The friction locking between the inner wall 18*i* and the radially outer surface of the slug 43 is enhanced by the cooperation of the ribs 26 with the slug 43.

FIGS. 8A to 8E show a functional element 10 formed as a nut element for a self-punching attachment to a workpiece 36 as previously described. The nut element can serve to fasten a further object to the workpiece 36, for example by clamping the object, for example a cable lug, between the nut element and a fixing element 46. For this purpose, the nut element has an annular clamping surface 48 that extends in the radial direction and that is arranged at the head part 12 at a side remote from the punching section 16. In the embodiment shown, the fixing element 46 is fixable to the nut element by means of a rotational movement. It can be configured as a fixing screw, as shown in FIGS. 8A to 8E.

To ensure a fastening in a manner secure against rotation of the object to be fastened, the clamping surface 48 has spike-shaped elevated portions 50 (FIG. 8A) that dig into the object on the fastening of the fixing element 46 to the nut element and thus prevent a rotation of the object relative to the nut element. Naturally, such spike-like elevated portions 50 are optional and a nut element without such elevated portions 50, with elevated portions 50 in a modified form, and/or without a clamping surface 48 can be used in a comparable manner.

To secure the nut element itself to the workpiece 36 in a manner secure against rotation, the contact surface 14 formed at the head part 12 has a plurality of elevated portions 52 and recesses 54 (FIG. 8C) which serve as features providing security against rotation, which dig into the material of the workpiece 36, or into which material of the workpiece 36 flows on the fastening of the functional element 10. In addition, the punching section 16 has ribs 56 providing security against rotation on the outer wall 18*a* of the wall 18 that are distributed in the peripheral direction, that extend in the axial direction, and that likewise prevent a rotation of the functional element 10 with respect to the workpiece 36. Naturally, depending on the application and depending on the materials used for the workpiece and/or the functional element, the described elements 52, 54, 56 providing security against rotation can be present independently of one another or combined with one another in any desired manner, wherein modifications of the elements 52, 54, 56 providing security against rotation are possible.

The nut element has a cavity 20, such as has already been described in connection with FIGS. 1 to 7, in the punching section 16. In the case of the nut element, the cavity 20, however, so-to-say continues into or through the head section 12 so that the nut element ultimately has an axial passage opening 58 that extends from the clamping surface 48 up to the punching edge 22.

Figure 8A:
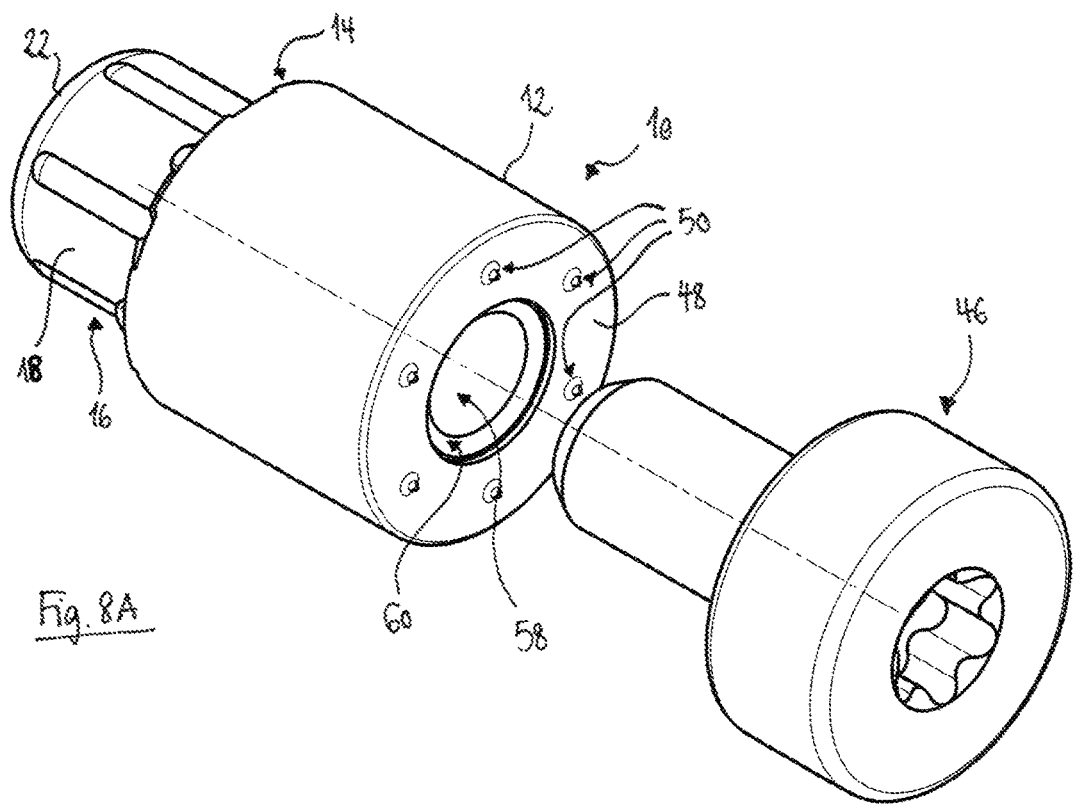
FIG. 8A a perspective representation of a functional element formed as a nut element and having a security against rotation and a fixing element.
Figure 8B:
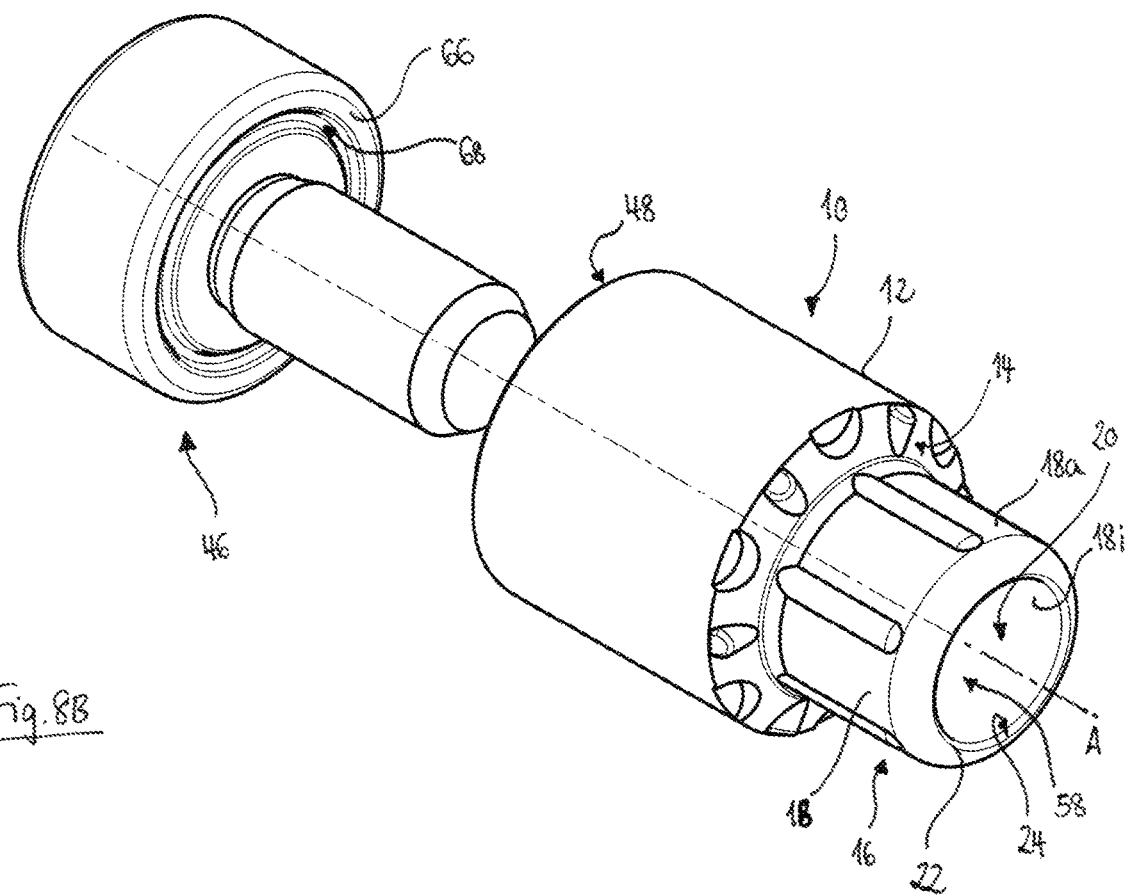
FIG. 8B a perspective representation rotated by 180° of the functional element in accordance with FIG. 8A.
Figure 8C:
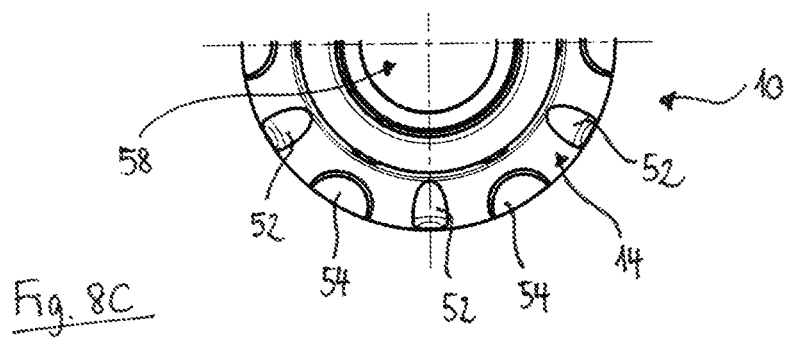
FIG. 8C a plan view of a contact surface of the nut element in accordance with FIG. 8A.
Figure 8D:
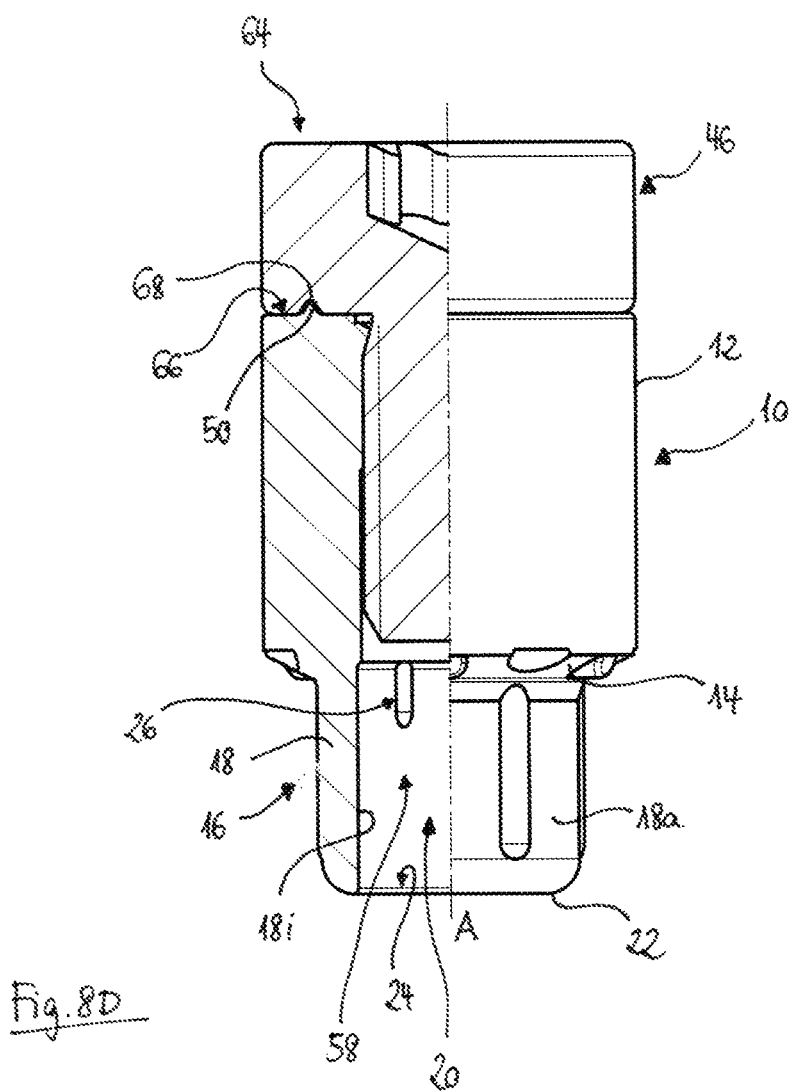
FIG. 8D a cross-sectional view of the nut element and of the fixing element in accordance with FIG. 8A in an assembled state.
Figure 8E:
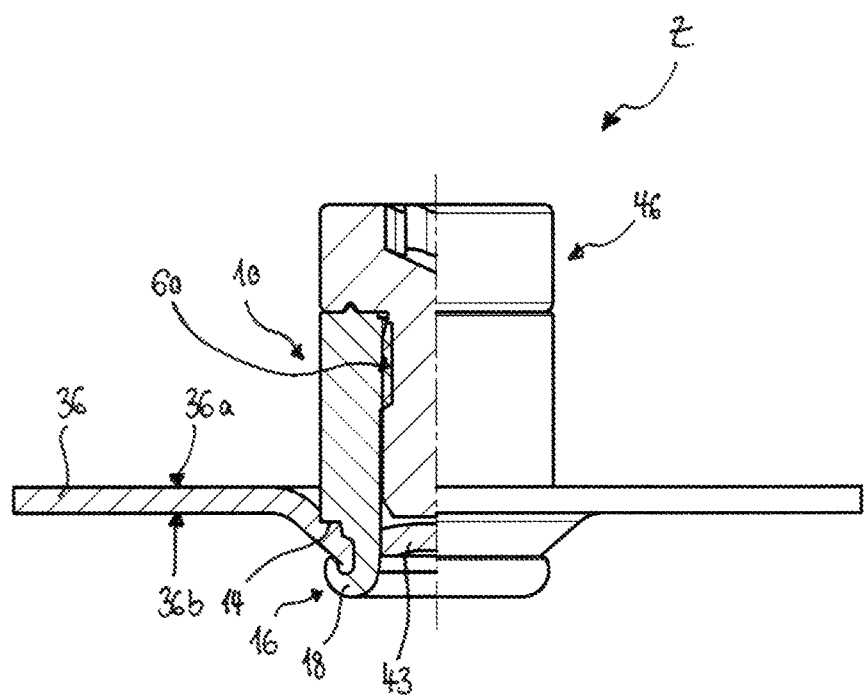
FIG. 8E a cross-sectional view of a component assembly comprising a workpiece and the assembled functional unit in accordance with FIG. 8D.

In the head part 25 of the nut element, an internal thread 60 is sectionally formed in the passage opening 58 in the axial direction (FIG. 8E) and extends, starting from the clamping surface 48, in the present embodiment. The fixing element 46 configured as a fixing screw has an external thread 62, corresponding to the internal thread 60, for fixing to the nut element. The internal thread 60 ends in the head part 12 such that the punching section 16 and in particular its inner wall 18*i* no longer has an internal thread 60 (FIG. 8D). In a portion of the punching section adjoining the head part 12 in the axial direction, ribs 26 extending in the axial direction are arranged on the inner wall 18*i* (FIG. 8D) and serve as an elevated slug securing portion for a slug 43 (FIG. 8E). As already described above, the axial length and further properties of the axial ribs 26 can be adapted almost as desired in dependence on the thickness of the workpiece 36, and thus of the slug 43, and for the optimization of the setting process.

The fastening of the nut element to the workpiece 36 generally takes place as already described in connection with FIGS. 1 to 7 using a setting device. Provision can in this respect be made that only the nut element is inserted into the workpiece 36 by means of the setting device. In order not to damage possibly present spike-like elevated portions 50 during the setting process, the setting head can have a corresponding cut-out such, for example, a circular recess. Alternatively, provision can be made that the nut element, together with the fixing element 46 fastened thereto, is inserted into the workpiece 36, wherein an end section of the fixing element 46 remote from the punching section 16 and extending in the radial direction can serve as the setting surface 64. In this case, the fixing element 46 can, in a contact surface 66 facing the clamping surface 48, have a cut-out 68 for receiving and protecting the spike-shaped elevated portions 50 from destruction.

In order to ensure, in particular in the latter case, that the slug 43 separated from the workpiece 36 on the punching of the nut element into the workpiece 36 is effectively clamped in the punching section 16 by the axial ribs 26, provision can be made that the fixing element 46 only extends through the head part 12, but not into or even through the punching section 16 in the state fastened to the nut element (FIG. 8E). Thus, a collision between the fixing element 46 and the slug 43 can be avoided.

In cases in which the slug 43 in the completed component assembly Z does not impair the function of the nut element, the slug 43 can remain in the component assembly Z as shown in FIG. 8E. If the slug 43 is interfering, for example because a passage opening is to be created in the workpiece 36 by means of the nut element, the slug 43 can be removed from the component assembly Z after the setting process. In this case, provision can be made that the axial ribs 26 are not reshaped during the setting process and that no undercut H (cf. FIG. 7A) is formed, but rather that the slug 43 is merely held in a friction-locked manner in the punching section 16 by the axial ribs 26. The subsequent removal of the slug 43 from the assembly portion Z is thus facilitated.

REFERENCE NUMERAL LIST 10 functional element
12 head part
14 contact surface
16 punching section
18 wall
18*a* outer wall
18*i* inner wall
20 cavity
22 punching edge
24 opening
26 axial rib
28 base section
28*k* conical section
28*z* cylindrical recess
30 region free of elevated portions
32 transition section
34 setting head
36 workpiece
36*a*, 36*b* workpiece layer
38 die
38*a* support surface
39 inlet radius
40 separating edge
42 die plunger
43 slug
44 curved die section
46 fixing element
48 clamping surface
50 spike-shaped elevated portions of the clamping surface
52 elevated portions of the contact surface
54 recesses of the contact surface
56 ribs providing security against rotation of the punching section
58 passage opening
60 internal thread of the nut element
62 external thread of the fixing element 64 setting surface
66 contact surface of the fixing element
68 cut-out
A longitudinal axis
S1, S2,
S1a, S2a cutting plane
H undercut
Z component assembly

The invention claimed is:

1. A self-punching functional element that is adapted for punching into a sheet metal part, said self-punching functional element comprising
   a head part (12) forming a flange and having a contact surface (14) for contact with the workpiece; and
   a punching section (16) that extends away from the head part, from the contact surface, and that is arranged coaxially to a central longitudinal axis (A) of the functional element,
   wherein the punching section has a peripheral punching edge (22) at a free end for punching through the workpiece and in a peripheral direction, said cavity (20) having an opening (24) defined by the punching edge, and
   wherein an inner wall (18i) of the punching section facing the cavity has at least one elevated rib projecting radially inwardly into the cavity, and extending in an axial direction, and
   wherein a first region of the inner wall starting adjacent the punching edge and extending toward the head part is a plain cylinder free of ribs or other structures that extends more than 50% of the axial length of the cavity.

2. A self-punching functional element in accordance with claim 1, wherein the punching section is designed as a rivet section that can be reshaped to establish a form fit with the workpiece.

3. A self-punching functional element in accordance with claim 1, wherein the contact surface surrounds the punching section in the peripheral direction in an axial end view, wherein the contact surface is of annular design.

4. A self-punching functional element in accordance with claim 1, claim 2, or claim 3 wherein the contact surface and an outer wall section (18a) of the punching section, which is arranged in parallel with the longitudinal axis, are in connection with one another via a transition section (32), wherein the transition section is formed and arranged at least sectionally curved and/or obliquely with respect to the longitudinal axis.

5. A self-punching functional element in accordance with claim 1, wherein the contact surface, a transition section, and/or the outer wall section is/are provided with at least one feature providing security against rotation, in particular wherein the feature providing security against rotation comprises an elevated portion or a recess.

6. A self-punching functional element in accordance with claim 1, wherein the elevated rib resides only in an axial end region of the cavity that is remote from the opening of the cavity, wherein the end region comprises less than 40% of an axial extent of the cavity.

7. A self-punching functional element in accordance with claim 1, wherein the cavity is bounded in the axial direction at a side remote from the opening by an end section (28) that has a stepped recess (28z).

8. A self-punching functional element in accordance with claim 1, wherein the functional element is a bolt element that has a bolt section extending from the head part at a side remote from the punching section, wherein the bolt section is at least sectionally provided with an external thread.

9. A component assembly comprising a functional element claim 1; and a workpiece, comprising at least one sheet metal part, wherein a slug (43) punched out by the punching section is arranged in the cavity and is held in a friction-locked and/or form-fitted manner in the cavity by the rib.

10. A component assembly in accordance with claim 9, wherein the slug is held in a form-fitted manner in the cavity by an end section (H) of the rib of greater elevation that engages the slug at a back side of the slug remote from the head part.

11. A component assembly in accordance with claim 10, wherein the end section of the rib occupies an undercut in the slug that extends in a radial direction.

12. A component assembly in accordance with claim 9 wherein the slug and a rib end lie flush with one another at a side remote from the head part.

13. A component assembly in accordance with claim 9, wherein one of the punching sections is formed as a rivet section and it engages behind the workpiece at a side remote from the head part.

14. A component assembly in accordance with claim 13, wherein the workpiece comprises at least two layers, that are both punched through by the punching section.

* * * * *